(12) United States Patent
Hase

(10) Patent No.: US 6,571,999 B2
(45) Date of Patent: Jun. 3, 2003

(54) CONNECTING ROD FRACTURE MACHINE AND METHOD FOR FRACTURE SEPARATING CONNECTING ROD USING THE MACHINE

(75) Inventor: Hiroichi Hase, Ueno (JP)

(73) Assignee: Yasunaga Corporation, Ueno (JP)

(*) Notice: Subject to any disclaimer, the term of this patent is extended or adjusted under 35 U.S.C. 154(b) by 0 days.

(21) Appl. No.: 09/799,388

(22) Filed: Mar. 5, 2001

(65) Prior Publication Data

US 2002/0023939 A1 Feb. 28, 2002

(30) Foreign Application Priority Data

Aug. 24, 2000 (JP) .......................... 2000-253872

(51) Int. Cl.⁷ .............................. B26F 3/00; B65H 35/10
(52) U.S. Cl. ............................. 225/1; 225/97; 225/103
(58) Field of Search .......................... 225/1–5, 93–106; 29/888.09

(56) References Cited

U.S. PATENT DOCUMENTS

| | | | | | |
|---|---|---|---|---|---|
| 2,703,263 A | * | 3/1955 | Zernov | ................ | 29/888.09 |
| 3,285,098 A | * | 11/1966 | Beveridge | ................ | 29/413 |
| 4,569,109 A | * | 2/1986 | Fetouh | ................ | 29/413 |
| 4,768,694 A | * | 9/1988 | Fabris et al. | ................ | 225/100 |
| 4,993,134 A | * | 2/1991 | Hoag et al. | ................ | 29/413 |
| 5,105,538 A | * | 4/1992 | Hoag et al. | ................ | 29/888.09 |
| 5,169,046 A | * | 12/1992 | Miessen et al. | ................ | 225/100 |
| 5,263,622 A | * | 11/1993 | Henzler et al. | ................ | 225/103 |
| 5,283,938 A | * | 2/1994 | Jones | ................ | 29/888.09 |
| 5,320,265 A | * | 6/1994 | Becker | ................ | 225/104 |
| 5,503,317 A | * | 4/1996 | Jones et al. | ................ | 225/100 |
| 5,507,093 A | * | 4/1996 | Wittenstein et al. | ................ | 225/103 |
| 5,568,891 A | * | 10/1996 | Hoag et al. | ................ | 225/93 |
| 5,699,947 A | * | 12/1997 | Cavallo et al. | ................ | 225/101 |
| 5,911,349 A | * | 6/1999 | Wiesemann et al. | ................ | 225/103 |
| 5,941,515 A | * | 8/1999 | Salow | ................ | 29/281.1 |
| 5,974,663 A | * | 11/1999 | Ikeda et al. | ................ | 29/888.09 |
| 6,427,326 B1 | * | 8/2002 | Soga et al. | ................ | 29/888.09 |
| 6,457,621 B1 | * | 10/2002 | Hähnel et al. | ................ | 225/103 |
| 6,474,526 B1 | * | 11/2002 | Hahnel et al. | ................ | 225/100 |

FOREIGN PATENT DOCUMENTS

| | | | |
|---|---|---|---|
| DE | 93 20 463.9 U1 | 8/1994 | |
| DE | 4406981 | * 9/1994 | ................ 225/103 |
| DE | 44 42 062 A1 | 5/1996 | |
| DE | 197 33 387 A1 | 2/1999 | |

* cited by examiner

Primary Examiner—Allan N. Shoap
Assistant Examiner—Jason Prone
(74) Attorney, Agent, or Firm—Frishauf, Holtz, Goodman & Chick, P.C.

(57) ABSTRACT

A connecting rod fracture machine is disclosed which mateably inserts a half-split type mandrel into an opening of a large end portion of a connecting rod to expand the opening. The machine comprises first and second support members (31), (32) for supporting the connecting rod horizontally, the support members being arranged movably apart from each other on the base of a pallet (24) for placing the connecting rod (1) thereon. Moreover, the machine includes a half-split type mandrel (36), vertically provided on these support members, comprising mandrel half portions (37), (38) with each outer peripheral surface thereof being in contact with the inner surface of the opening. The machine also comprises a wedge (53) for separating the mandrel half portions uniformly apart from each other, the wedge having tapered surfaces in contact with opposite edge surfaces of the mandrel half portions.

8 Claims, 8 Drawing Sheets

CONNECTING ROD FRACTURE MACHINE AND METHOD FOR FRACTURE SEPARATING CONNECTING ROD USING THE MACHINE

BACKGROUND OF THE INVENTION

1. Field of the Invention

The present invention relates to a machine for fracture separating a connecting rod and a method for fracture separating a connecting rod using the machine. More particularly, it relates to a machine and a method for fracture separating a connecting rod, in which a half-split type mandrel is fitted into an opening of a large end portion of a connecting rod to expand the opposed half portions of the mandrel and thus separate said opening portion, and the large end portion of said connecting rod is thereby fracture separated into a cap portion and a rod portion along embrittled portions, which are provided in advance on the inner surface of the opening portion.

2. Related Arts

A connecting rod (hereinafter referred to as a con-rod) is to connect between the crankshaft and the piston head of an engine. The con-rod has a bearing portion or an opening of the large end portion (hereinafter referred to as a large end bearing) and another bearing portion or a small end portion (hereinafter referred to as a small end bearing). The large end bearing supports a journal of said crankshaft, while the small end bearing supports the piston pin. The piston pin is allowed to penetrate the small end bearing and both ends thereof are supported by the bearings of the piston head. On the other hand, the large end bearing is separated into halves, or rod and cap portions, at a predetermined diametric position to encircle a journal of the crankshaft. After that, the rod and cap portions are bolted securely to each other to support said journal.

There is an FS (Fracture Separation) technique available for separating the large end portion of the con-rod into halves or rod and cap portions. FIG. 1 is an explanatory view illustrating the fracture of the con-rod by a related FS technique. As shown in FIG. 1, along the axial direction, provided are in advance embrittled portions, for example, notch grooves 2a, 2a subject to a concentrated stress at predetermined diametrical positions of the large end bearing 2 of the integral preform con-rod 1. Then, the large end bearing 2 is mated with the half portions 4a, 4b of a half-split type mandrel 4 which are separated into halves at the positions corresponding to the notch grooves 2a. Thereafter, a wedge 5 is inserted in between the mandrel half portions 4a, 4b to provide a separating force therebetween, thereby fracture separating a large end portion 1a starting from the notch grooves 2a, 2a. The present fracture separation method is to thus fracture separate the con-rod 1 into a rod portion 1A and a cap portion 1B.

Now, a con-rod fracture machine is considered which causes fracture separation of the large end portion 1a of the con-rod into the rod portion 1A and the cap portion 1B in accordance with the aforementioned FS technique. In the machine, any one of the mandrel half portions 4a, 4b, for example, the mandrel half portion 4a is fixed to a support member 7, whereas the other mandrel half portion 4b is fixed to a support member 8 which is slidable apart from the mandrel half portion 4a. On the support member 8, there is provided a clamp member 9 for clamping the small end portion 1b of the con-rod 1. Also provided thereon are clamp members 10, 10 and 11, 11 for clamping both right and left shoulder portions of and both sides of the rod portion 1A of the large end portion 1a. Moreover, provided on the support member 7 are clamp members 12, 12 for clamping both right and left shoulder portions of the cap portion 1B.

Upon fracture of the large end portion 1a, each of the clamp members 9–12 first clamps securely the con-rod 1 at the front, back, right, and left thereof. Subsequently, the wedge 5 is used to expand the mandrel half portions 4a, 4b and thus fracture separate the large end portion 1a, or the large end bearing 2 along the notch grooves 2a, 2a. As the large end portion 1a is fracture separated, the support member 8 moves in the direction shown by the arrow to cause the con-rod 1 to be separated into halves, or the rod portion 1A and the cap portion 1B.

However, the aforementioned con-rod fracture machine clamps both the right and left shoulder portions of the rod portion 1A of the con-rod 1 or the vicinity thereof, both the right and left side portions, the large end portion 1a, and the small end portion 1b. This clamping arrangement readily causes the aforementioned con-rod fracture machine to provide chipping upon fracture and a bad surface property (surface roughness) for the fracture planes. In addition, movement of only one half of the mandrel or the mandrel half portion 4b (one-half movable mandrel) will not allow the large end bearing 2 to be uniformly loaded for expansion. Therefore, such a problem is introduced that the con-rod fractured by the aforementioned con-rod fracture machine is provided with a large amount of strain and an unstable shape of split planes.

SUMMARY OF THE INVENTION

The present invention was developed in view of the aforementioned problems. An object of the present invention is to provide a con-rod fracture machine which eliminates chipping upon fracture and provides stable properties for fracture surfaces. Another object is to provide a method for fracturing a con-rod using the machine.

To achieve the aforementioned object, the con-rod fracture machine according to the present invention comprises first and second support members for horizontally supporting a large end portion and a rod portion of a con-rod. The first and second support members are arranged movably apart from each other on a base of a pallet for placing thereon the con-rod to be fractured. The machine also comprises a half-split type mandrel, vertically provided on said first and second support members, comprising two mandrel half portions with each outer peripheral surface thereof fitted into and in contact with an inner surface of an opening of said large end portion. Moreover, the machine comprises a wedge, with tapered surfaces in contact with opposite edge surfaces of said mandrel half portions, for separating said mandrel half portions uniformly apart from each other. The machine also comprises an actuator for applying a load to said wedge. Furthermore, the machine comprises control means for applying an initial load to said actuator to bring each of said mandrel half portions into contact with said inner surface of the opening and thereafter applying a fracture load to instantaneously fracture said opening.

On the other hand, the method for fracture separating a con-rod according to the present invention comprises a step of placing a con-rod to be fractured on a pallet. The method further comprises a step of holding said con-rod by supporting a large end portion and a rod portion of said con-rod by means of first and second support members arranged on a base of said pallet movably apart from each other.

Furthermore, the method comprises a step of bringing each outer peripheral surface of a half-split type mandrel mateably into contact with the inner surface of an opening of said large end portion. Here, the half-split type mandrel is vertically provided on said first and second support members and comprises two mandrel half portions. The method also comprises a step of applying an initial load to the inner surface of said opening using a wedge to bring each of said mandrel half portions into contact with the inner surface of said opening. The wedge has tapered surfaces in contact with opposite edge surfaces of said mandrel half portions. Finally, the method comprises a step of fracturing said opening instantaneously by applying a fracture load to the inner surface of said opening using said wedge.

As described above, the half-split type mandrel is mated with the opening of the large end portion of the con-rod. Then, the opposite mandrel half portions are expanded to expand said opening in order to fracture separate said con-rod into cap and rod portions along embrittled portions provided in advance on the inner surface of said opening.

Said first support member preferably comprises a pressing member for pressing both shoulder portions of the cap portion of the con-rod against said mandrel half portions, respectively. Moreover, said second support member preferably comprises an engagement member for holding the small end portion of said con-rod.

When the control means apply the initial load to the actuator, the actuator extends to cause the wedge to be lowered and inserted in between the opposed mandrel half portions. The mandrel half portions are expanded with the wedge apart from each other to allow each of the outer peripheral surfaces thereof to be positively brought into contact with the inner peripheral surface of the opening of the large end portion. Then, upon application of the fracture load to the actuator, the wedge expands instantaneously the opposed mandrel half portions apart from each other in conjunction with the first and second support members, thereby fracture separating the opening instantaneously. The wedge has tapered surfaces to be in contact with the mandrel half portions, thereby separating uniformly the mandrel half portions apart from each other. As described above, the fracture load is instantaneously applied and the mandrel half portions are uniformly separated apart from each other. This thereby prevents chipping and provides a stable property for the fracture surfaces (surface roughness), thus making it possible to provide stabilized shapes for the split planes. In addition, it is made possible to reduce the amount of strain produced in the opening.

When the opening is fracture separated, any one of the embrittled portions formed on the large end bearing of the con-rod can be fractured first (first fracture) and then the other portion is fractured after a very short time lag (second fracture). The pressing member of the first support member presses both shoulder portions of the cap portion of the con-rod when fractured to hold the cap portion in cooperation with the mandrel half portions. The second support member allows the engagement member to engage the small end portion of the con-rod or engages the rod portion at the farthermost position from the mandrel half portions, thereby well preventing sideward displacement of the rod portion. This makes it possible to provide a stabilized property for the fracture surfaces subjected to the second fracture caused by said time lag.

The con-rod is preferably fractured using a con-rod fracture machine in which the engagement member of the second support member has, on a front-end portion thereof, a notch opened in the shape of a letter V.

It is possible to prevent displacement of the con-rod by holding, with the notch opened in the shape of a letter V, the small end portion of the con-rod when fractured. The shape of the fracture surfaces of the con-rod can thereby be stabilized.

The con-rod is preferably fractured using a con-rod fracture machine in which each of the mandrel half portions is allowed to contact with the inner surface of the large end bearing at three points of the outer peripheral surface of each of the mandrel half portions.

The three-point support structure of the mandrel makes it possible to bring the mandrel half portions into good contact with the inner surface of the large end bearing. This is particularly useful when the unfinished (e.g., as forged) large end bearing of the con-rod is fractured (cracked).

The con-rod is preferably fractured using a con-rod fracture machine comprising an actuator and a cylinder for moving the wedge toward the mandrel. Here, the actuator comprises an accumulator for accumulating a high-pressure working fluid and a valve for instantaneously supplying the high-pressure working fluid from the accumulator to the cylinder.

The accumulator is employed to apply the fracture load to the large end bearing instantaneously. This makes it thereby possible to provide a stable property for the fracture surfaces (surface roughness) and provide stabilized shapes for the split planes.

DETAILED DESCRIPTION OF THE PREFERRED EMBODIMENT

Now, the embodiment of the present invention will be explained below in detail with reference to the accompanying drawings.

Figure 2:
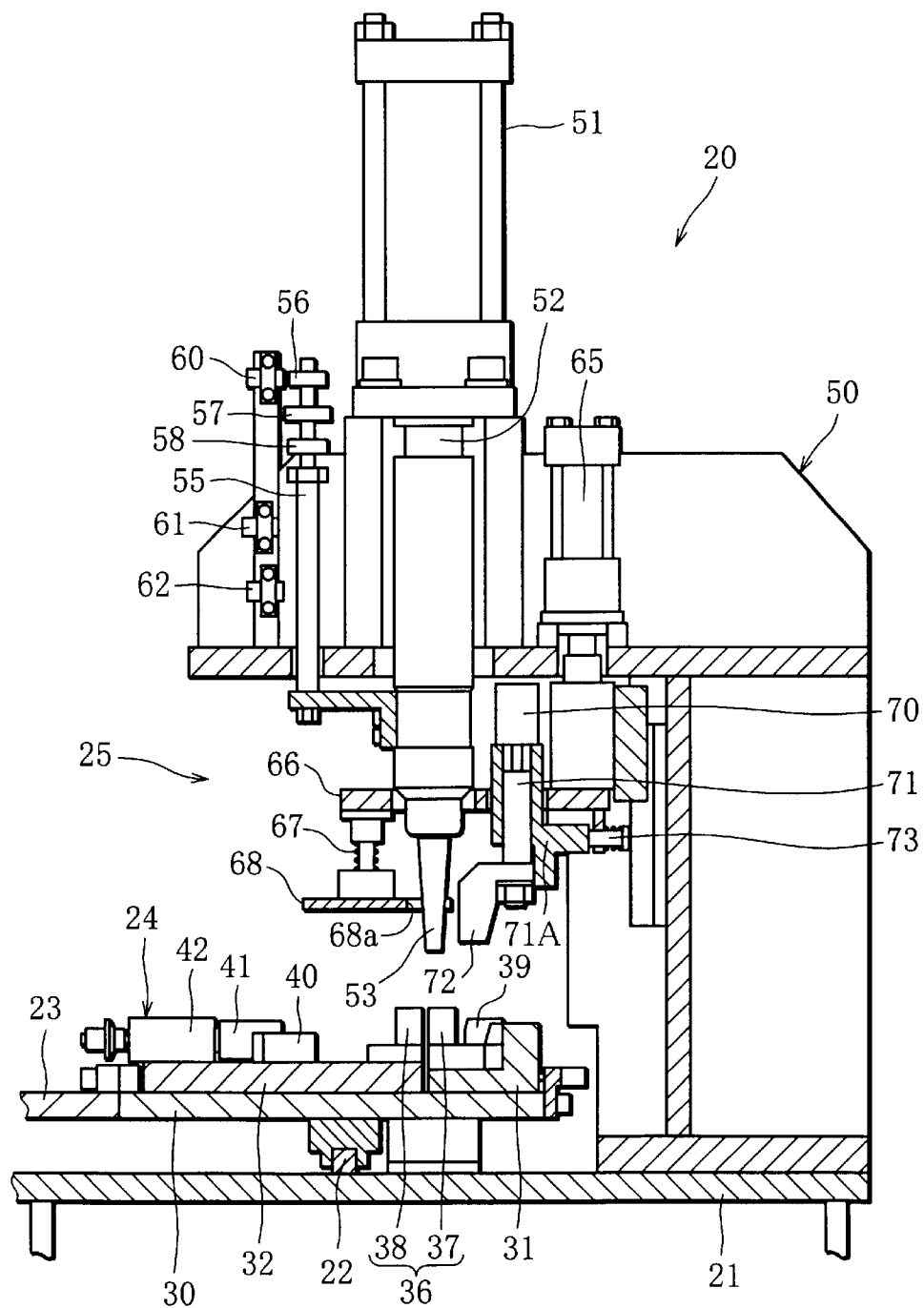
FIG. 2 is a cross-sectional view illustrating the main portion of a con-rod fracture machine according to the present invention.
Figure 3:
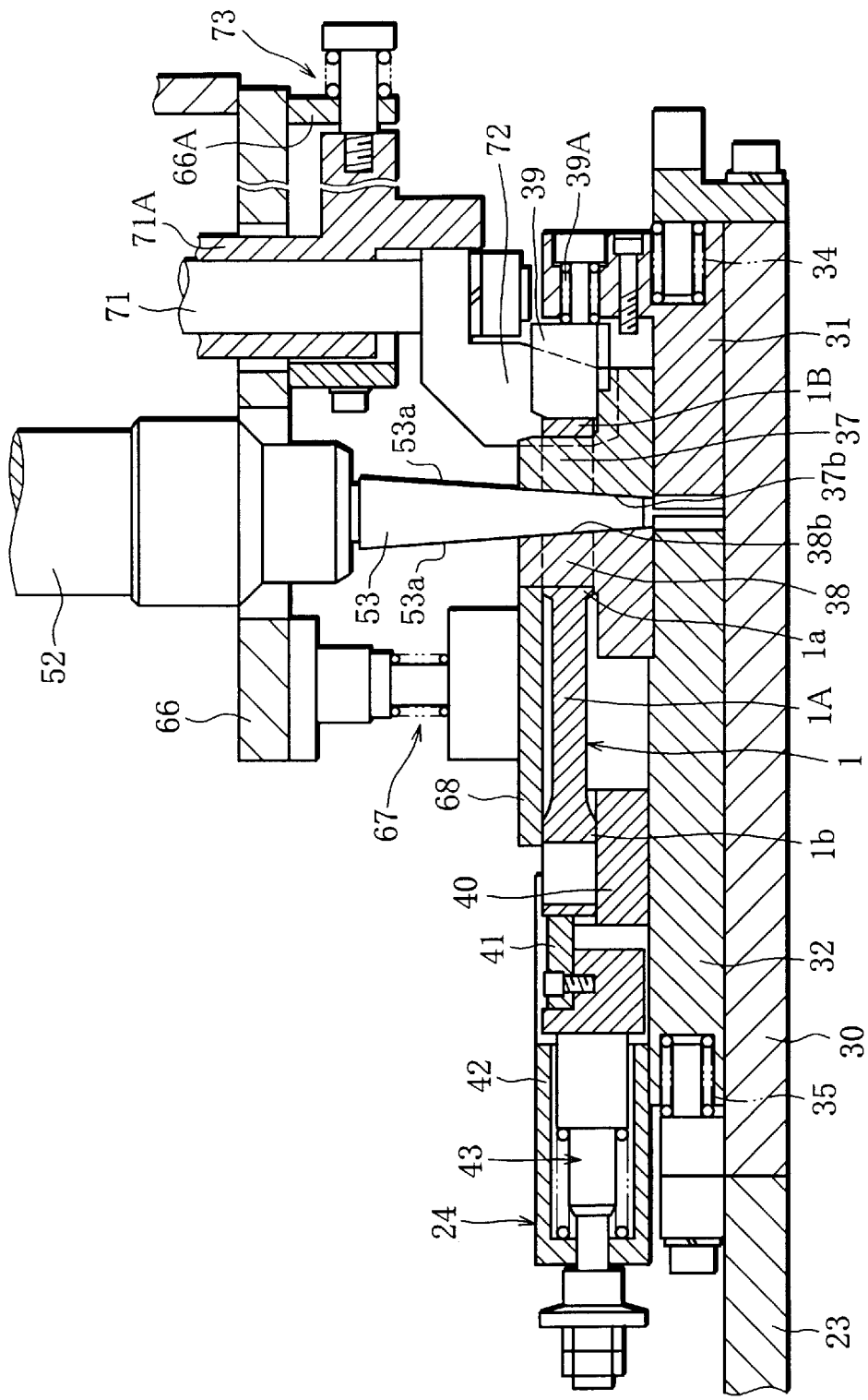
FIG. 3 is an enlarged cross-sectional view illustrating the main portion of FIG. 2.
Figure 4:
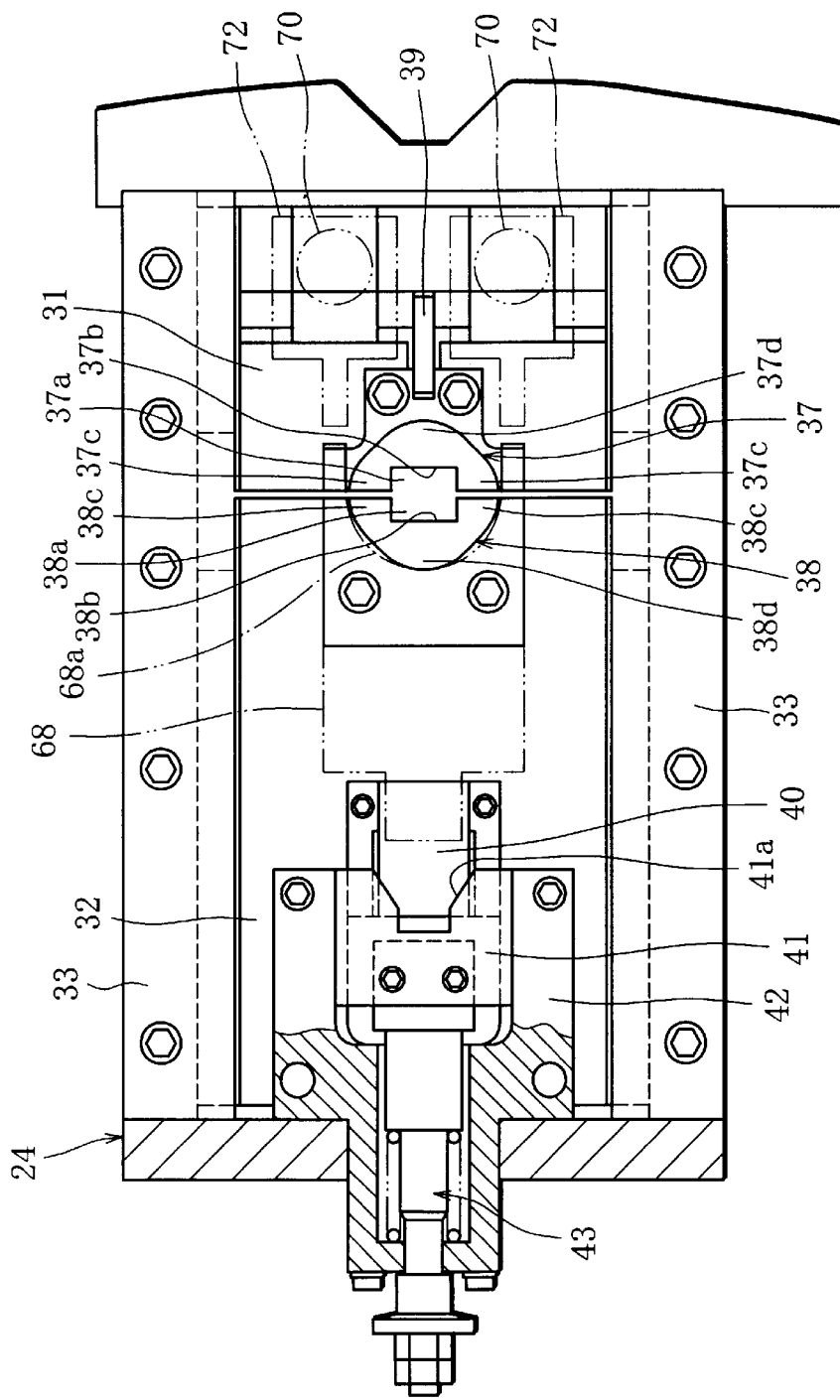
FIG. 4 is a partially cut-away plan view illustrating the pallet shown in FIG. 2.

FIG. 2 is a cross-sectional view illustrating the main portion of a con-rod fracture machine according to the present invention. FIG. 3 is an enlarged cross-sectional view illustrating the main portion of FIG. 2. FIG. 4 is a partially cut-away plan view illustrating the pallet shown in FIG. 3. Referring to FIGS. 2 and 3, the con-rod fracture machine 20 comprises a turntable 23 and a fracture mechanism portion 25 for fracturing the con-rod 1. The turntable 23 is arranged horizontally and rotatably on a frame 21 via a guide rail 22. The fracture mechanism portion 25 is installed on the frame 21 via a frame 50 and fractures the con-rod 1 (FIG. 3) horizontally supported by a pallet 24. A plurality of pallets 24 (only one of them is shown) is horizontally supported on the outer peripheral portion of the turntable 23.

The pallet 24 has two support members 31, 32 disposed opposite to each other with a small spacing provided therebetween on a base 30. Both side portions of the pallet 24 are prevented from being dislodged by guide rails 33, 33 (FIG. 4) and made slidable apart from each other in the longitudinal direction (along the length of the con-rod 1). As shown in FIG. 3, there are interposed shock absorber mechanisms 34, 35 between the support members 31, 32 and the base 30, respectively. The shock absorber mechanisms 34, 35 comprise coil springs. The shock absorber mechanisms 34, 35 serve to retain the support members 31, 32 at their initial position, provide a shock absorbing action thereto upon fracture of the con-rod 1, and function to return the support members 31, 32 to their initial positions after fracture. The support member 31 supports the cap portion 1B of the con-rod 1, while the support member 32 supports the rod portion 1A.

As shown in FIG. 4, a half-split type mandrel 36 is provided vertically on the upper surface of each of the front-end sides of the support members 31, 32 disposed opposite to each other. The mandrel 36 comprises two mandrel half portions 37, 38 and the opposed edge surfaces thereof are flush with the edge surfaces of the support members 31, 32, respectively. The base portion of the mandrel half portions 37, 38 allows the end surface of the large end portion 1a of the con-rod 1 to be placed and held horizontally thereon (FIG. 3). As shown in FIGS. 3 and 4, grooves 37a, 38a are provided vertically opposite to each other at the center of the edge surface of the mandrel half portions 37, 38. Bottom surfaces (end surfaces) 37b, 38b, disposed opposite to each other, of the grooves 37a, 38a are tapered so as to make the depth of the grooves shallower from the upper to lower end. The grooves 37a, 38a cooperate with each other to form a hole for a wedge 53, described later, to pass therethrough.

As shown in FIG. 4, two notch surfaces are formed along the axial direction on the outer peripheral surface, shaped in a semicircular cylinder, of the mandrel half portion 37. The mandrel half portion 37 is adapted to provide small contact areas at three points of the both end portions 37c, 37c and the middle portion 37d to contact with the inner surface of the large end bearing 2 of the con-rod 1. Like the mandrel half portion 37, the mandrel half portion 38 is also adapted to contact with both surfaces of the large end bearing 2 of the con-rod 1. Each of the mandrel half portions 37, 38 is thus allowed to contact with the inner surface of the large end bearing 2 at the three points of the outer peripheral surface (that is, by three point support). The three-point support structure of the mandrel 36 makes it possible to bring the mandrel half portions 37, 38 into good contact with the inner surface of the large end bearing 2. This is particularly useful when the unfinished (e.g., as forged) large end bearing 2 of the con-rod 1 is fractured (cracked).

Incidentally, consider a case where the mandrel half portions 37, 38 are used in a step of boring and then fracturing the large end bearing 2 of the con-rod 1. In this case, the mandrel 36 may be formed to provide each outer peripheral surface of the mandrel half portions 37, 38 with a semicircular cylinder in shape such that the entire periphery thereof is in contact with the inner surface of the large end bearing 2.

As shown in FIGS. 3 and 4, on the upper middle portion of the support member 31, there is provided a pressing member 39 spaced apart by a predetermined spacing from the mandrel half portion 37. The pressing member 39 is activated by a coil spring 39A toward the mandrel half portion 37. The pressing member 39 serves to press the middle portion of the cap portion 1B against the mandrel half portion 37 to prevent the displacement of the cap portion 1B when fractured.

On the upper surface of the rear end of the support member 32, there is provided a pedestal 40 for placing horizontally thereon the small end portion 1b of the con-rod 1. At a rear position of the pedestal 40, there is provided an engagement member 41 for engaging the small end portion 1b slidably in the longitudinal direction of the con-rod 1 via a support member 42. The engagement member 41 is provided, for example, with an engagement portion or a notch 41a (FIG. 4) opened in the shape of a letter V on the front end portion. The engagement member 41 is adapted to allow the notch 41a to engage (securely hold) the small end portion 1b of the con-rod 1. There is interposed a pressing mechanism 43 between the rear end portion of the engagement member 41 and the support member 42. The pressing mechanism 43 serves to press the inner surface of the large end bearing 2 on the rod portion 1A side against the mandrel half portion 38 with the force of the coil spring upon fracture of the con-rod 1, thereby preventing the displacement of the con-rod 1.

Incidentally, the engagement portion is not limited to the notch opened in the shape of a letter V but may be formed in other shapes, for example, in the shape of a Japanese character ⊐. Alternatively, instead of the notch, there may be provided a pin for engageably fitting into the small end bearing.

On the outer peripheral portion of the turntable 23, there are provided a plurality of pallets 24 configured as described in the foregoing, for example, eight pallets along the periphery at predetermined intervals. The turntable 23 is adapted to be controllably located successively at a predetermined position by a drive mechanism (not shown). For example, the turntable 23 is controllably located in sequence at a work (con-rod) loading position (step 1), work cracking (fracture) position (step 2), alignment surface brushing position (step 3), bolt insertion position (step 4), bolt temporary fastening position (step 5), bolt final fastening position (step 6), bush press-in position (step 7), and work unloading position (step 8). Work is carried out automatically at each of these positions (steps). Incidentally, the aforementioned steps 1 to 8 are examples of a machining process and thus the alignment surface brushing (step 3) and the bush press-in (step 7) may be omitted in some cases.

Figure 1:
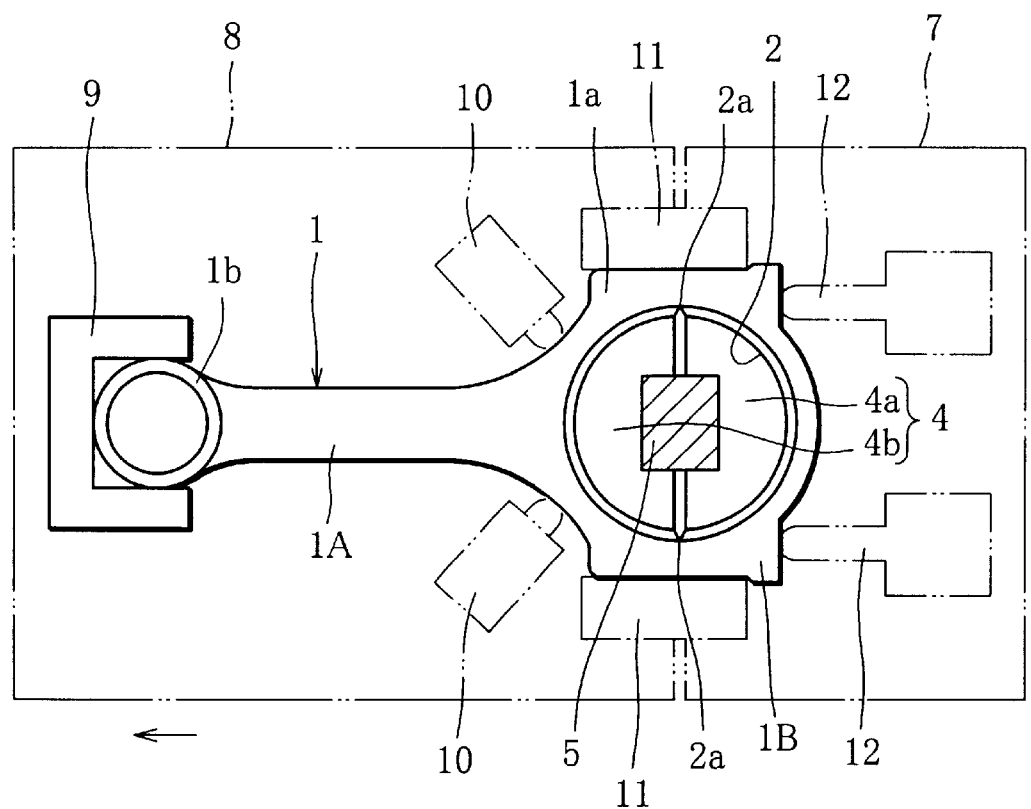
FIG. 1 is an explanatory view illustrating the fracture of a con-rod by a related FS method.

Referring back to FIG. 2, the fracture mechanism portion 25 is provided vertically with an actuator or a hydraulic cylinder 51 above the center of the mandrel 36 on the frame 50, which is vertically installed on the frame 21. In addition, the fracture mechanism portion 25 has the wedge 53 installed on the tip of a rod 52 to oppose the grooves 37a, 38a of the mandrel half portions 37, 38. The wedge 53 is adapted to be inserted into the grooves 37a, 38a vertically from above. Moreover, as shown in FIG. 3, the wedge 53 has both surfaces 53a, 53a, which are opposite to the bottom surfaces 37b, 38b and tapered corresponding to the bottom surfaces. The wedge 53 is lifted or lowered by the hydraulic cylinder 51 (FIG. 1) and serves to expand the mandrel half portions 37, 38 apart from each other when lowered.

A rod 55 is secured in parallel to the rod 52 and has dogs 56–58 mounted on the upper portion thereof for detecting position. In addition, the frame 50 is provided with position sensors 60–62 adapted to oppose the dogs 56–58. These position sensors 60–62 are used to detect the position of the wedge 53.

The frame 50 is provided vertically with an actuator or a hydraulic cylinder 65 in parallel to the hydraulic cylinder 51. In addition, the frame 50 has a support plate 66, the proximal end of which is horizontally secured to the tip of the rod. A pressing plate 68 is horizontally attached to the tip of the support plate 66 via a pressing mechanism 67. The pressing plate 68 is provided with a semicircular notch 68a to be pressed against the rim portion of the large end bearing 2 of the con-rod 1 (FIG. 4). Expansion of the cylinder 65 causes the pressing plate 68 to be lowered and pressed against the upper surface of the large end portion 1a and small end portion 1b of the con-rod 1, which is placed horizontally on and supported by the pallet 24. This allows the pressing plate 68 to engage the con-rod 1, thereby preventing the con-rod 1 from being displaced up and down upon fracture of the con-rod. Incidentally, even while the pressing plate 68 is pressing the aforementioned upper surface of the con-rod 1, the con-rod 1 can slide in the direction of fracture separation upon fracture.

Figure 5:
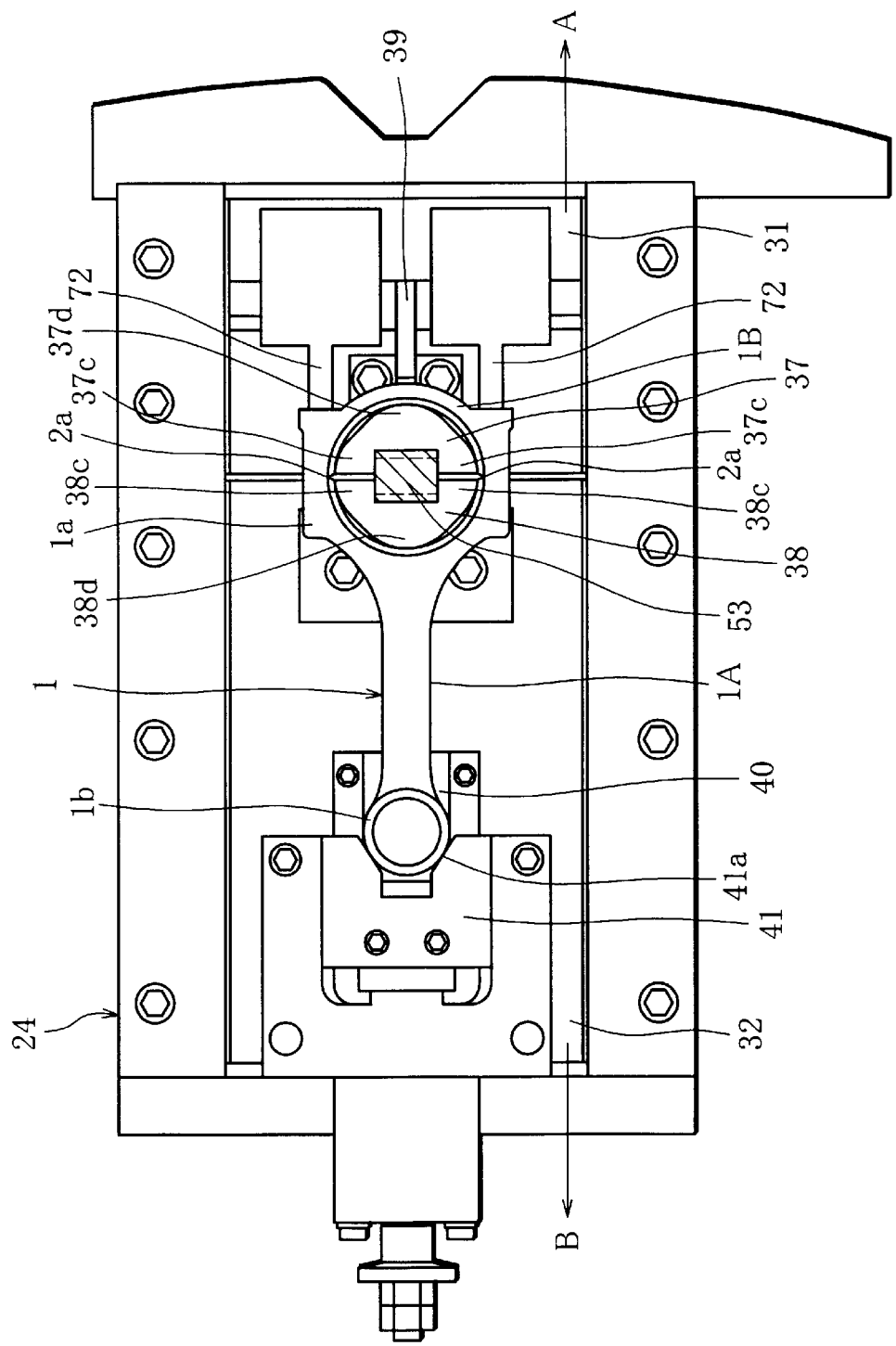
FIG. 5 is a plan view illustrating a pallet on which the con-rod shown in FIG. 3 is placed.

As shown in FIGS. 2 and 4, at the proximal end of the support plate 66 relative to the wedge 53, actuators or hydraulic cylinders 70, 70 are provided vertically on the right and left, spaced apart from each other by a predetermined spacing. The hydraulic cylinders 70, 70 are made movable along the direction of slide of the support member 31 of the pallet 24. In addition, the hydraulic cylinders 70, 70 are coupled with rods 71, 71, respectively, and each tip of the rods 71 is provided with engagement members 72, 72 (FIG. 5). Moreover, as shown in FIG. 3, there is interposed a pressing mechanism 73 comprising a coil spring between a proximal end side engagement portion 66A of the support plate 66 and a guide member 71A of the rods 71. Thus, the pressing mechanism 73 allows the hydraulic cylinders 70 or the engagement members 72 to be displaced in the direction of slide of the support member 31. Expansion of the hydraulic cylinders 70, 70 causes the right and left engagement members 72 to be lowered and thereby brought into elastic contact with the right and left shoulder portions of the cap portion 1B of the con-rod 1 supported by the mandrel 36. Thus, the engagement members 72, 72 hold the cap portion 1B upon fracture of the con-rod 1 in cooperation with the mandrel half portion 37.

Now, a control circuit of the hydraulic cylinder 51 will be explained.

Figure 6:
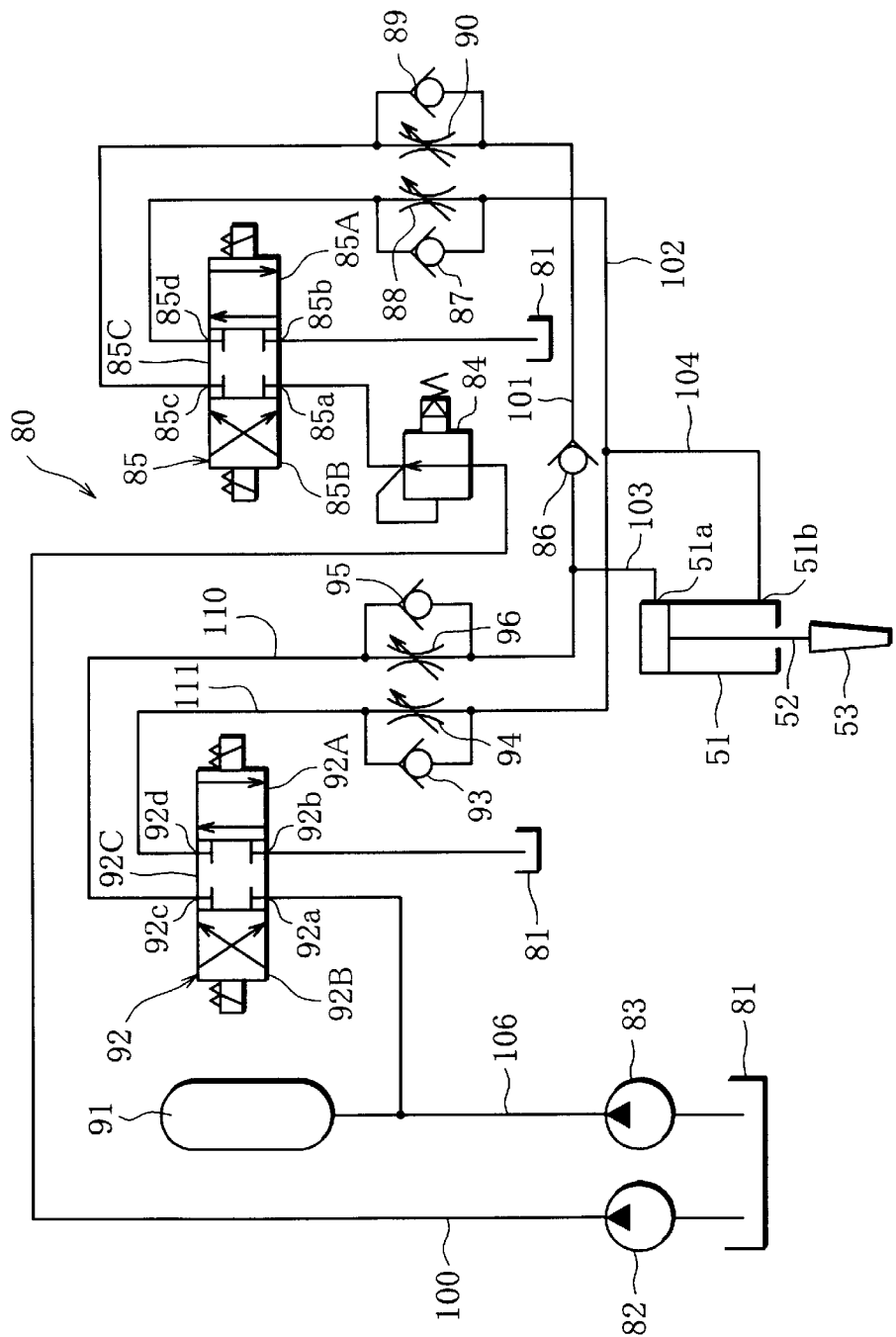
FIG. 6 is a block diagram illustrating a hydraulic control circuit for driving the fracture machine shown in FIG. 2.

FIG. 6 illustrates an example of a hydraulic control circuit 80 for driving the wedge 53. Upon fracture of the con-rod 1, the hydraulic control circuit 80 provides the wedge 53 with an initial load (pre-stress) to cause the mandrel 36 to contact with the inner surface of the large end bearing 2. Subsequently, the hydraulic control circuit 80 is adapted to provide a fracture load to the con-rod 1 to fracture (crack) the con-rod 1.

The hydraulic control circuit 80 comprises a low-pressure hydraulic pump 82 for providing pre-stress and a high-pressure hydraulic pump 83 for cracking. The low-pressure hydraulic pump 82 is connected to a port 85a of an electromagnetic selector valve (hereinafter simply referred to as a selector valve) 85 via a hydraulic passage 100 and a pressure reducer valve 84. A port 85b of the selector valve 85 is connected to a working fluid tank 81. A port 85c of the selector valve 85 is connected to a port 51a of the hydraulic cylinder 51 via a hydraulic passage 101, a check valve 86, and a hydraulic passage 103. A port 85d of the selector valve 85 is connected to a port Sib of the hydraulic cylinder 51 via hydraulic passages 102, 104. The selector valve 85 selectively assumes one of the positions 85A, 85B and 85C shown in FIG. 6. In addition, in the hydraulic passage 101, there is interposed a meter-out circuit comprising a parallel circuit of a check valve 87 and a throttle valve 88. On the other hand, in the hydraulic passage 102, there is interposed a meter-out circuit comprising a parallel circuit of a check valve 89 and a throttle valve 90. These meter-out circuits are generally used for controlling the speed of the cylinders (especially, vertical cylinders).

The high-pressure hydraulic pump 83 is connected to an accumulator 91 via a hydraulic passage 106 as well as to a port 92a of a selector valve 92. The high-pressure hydraulic pump 83 is allowed to accumulate a predetermined high-pressure working fluid in the accumulator 91. A port 92b of the selector valve 92 is connected to the working fluid tank 81. Ports 92c, 92d of the selector valve 92 are respectively connected to the ports 51a, 51b of the hydraulic cylinder 51 via hydraulic passages 110, 111. In addition, the hydraulic passage 101 is connected to the hydraulic passage 110, while the hydraulic passage 102 is connected to the hydraulic passage 111. The check valve 86 prevents the flow of the working fluid from the high-pressure hydraulic passage 110 to the low-pressure hydraulic passage 101. In addition, in the hydraulic passage 110, there is interposed a meter-out circuit comprising a parallel circuit of a check valve 95 and a throttle valve 96. On the other hand, in the hydraulic passage 111, there is also interposed a meter-out circuit comprising a parallel circuit of a check valve 93 and a throttle valve 94. The selector valves 85, 92 are controlled by means of a control circuit (not shown).

Now, the action of the present invention will be explained.

As described above, the con-rod 1 is loaded to the pallet 24 at the work loading position of the turntable 23 (see FIG. 5). That is, the mandrel 36 is fitted into the large end bearing 2 by insertion to support the large end portion 1a of the con-rod 1 and pressed against the pressing member 39. In addition, the small end portion 1b of the con-rod 1 is placed on the pedestal 40 and held by the notch 41a of the engagement member 41. This allows the con-rod 1 to be placed and held horizontally on the pallet 24.

Subsequently, the turntable 23 is turned to the work cracking (fracture) position and then the pallet 24 is positioned below the fracture mechanism portion 25 shown in FIG. 2. Then, the hydraulic cylinder 65 shown in FIG. 2 is extended to bring the pressing plate 68 into contact with the upper surface of the con-rod 1 (FIG. 3). At the same time, the right and left hydraulic cylinders 70, 70 extend to bring the engagement members 72, 72 into contact with both right and left shoulder portions of the cap portion 1B (FIGS. 3 and 5) to hold the con-rod 1.

Then, the low-pressure selector valve 85 of the hydraulic control circuit 80 shown in FIG. 6 is actuated to change a position 85C to a position 85A. This causes the low-pressure working fluid to be supplied from the low-pressure hydraulic pump 82 through the pressure reducer valve 84, the selector valve 85, the throttle valve 90, and the check valve 86 to the port 51a of the cylinder 51. On the other hand, the working fluid in the cylinder 51 is allowed to flow from the port 51b through the throttle valve 88 and the selector valve 85 to the tank 81. This causes the rod 52 to expand to start initial loading (pre-loading). At this time, the throttle valve 88 can be controlled to adjust the speed of the extension of the rod 52 to an appropriate one.

The wedge 53 is lowered as the rod 52 extends and inserted into each of the grooves 37a, 38a of the mandrel half portions 37, 38. Then, the mandrel half portions 37, 38 are expanded apart from each other with the wedge 53. This thereby allows both end portions and the middle portions 37c, 37c, 37d, 38c, 38c, 38d of each of the outer peripheral surfaces to positively contact with the inner peripheral surface of the large end bearing 2. Then, at these contact positions, the selector valve 85 is inactivated and switched to the position 85C, thereby causing the cylinder 51 to stop in the position.

Then, the high-pressure selector valve 92 is actuated to change a position 92C to a position 92A to initiate the fracture (cracking) of the large end bearing 2 of the con-rod 1. Switching the selector valve 92 to the position 92A causes the high-pressure working fluid to be instantaneously supplied from the accumulator 91 through the selector valve 92 and the check valve 95 to the port 51a of the cylinder 51. The check valve 86 prevents the high-pressure working fluid from flowing to the low-pressure selector valve 85. Instantaneous supply of the high-pressure working fluid to the cylinder 51 causes the rod 52 to expand instantaneously to provide a fracture load to the wedge 53. The working fluid in the cylinder 51 flows from the port 51b through the throttle valve 94 and the selector valve 92 to the tank 81. The throttle valve 96 can be controlled to adjust the speed of the fracture.

As shown in FIG. 5, once the fracture load is given, the wedge 53 is firmly inserted in between the mandrel half portions 37, 38 to expand them apart from each other in the directions shown by the arrows A, B. In this manner, the large end bearing 2 is instantaneously expanded and fracture separated along the notch grooves 2a, 2a, which are provided in advance on the inner surface of the large end bearing 2. The rod 52 of the cylinder 51 extends to a predetermined position (the end of the stroke) after the wedge 53 has fracture separated the large end bearing 2. Thereafter, the selector valve 92 is inactivated to change over to the position 92C to allow the wedge 53 to stop in the position. The support members 31, 32 move in the directions shown by the arrows A, B in conjunction with the mandrel half portions 37, 38. Thus, the accumulator 91 is employed to apply an instantaneous fracture load to the large end bearing 2. This thereby prevents chipping and provides a stable property for the fracture surfaces (surface roughness), thus making it possible to provide stabilized shapes for the split planes.

In addition, both surfaces 53a, 53a are each tapered which contact with the bottom surfaces 37b, 38b of the grooves 37a, 38a of the mandrel half portions 37, 38. It is therefore made possible for the wedge 53 to uniformly separate the mandrel half portions 37, 38 from each other. This makes it possible to provide stabilized shapes for the split planes of the large end bearing 2 as well as to reduce the amount of strain produced in the large end bearing 2.

Incidentally, when the large end bearing 2 is separated into halves, one of the right and left portions is fractured first (first fracture) and then the other portion is fractured after a very short time lag (second fracture). This therefore provides a bad property for the fracture surfaces subjected to the second fracture. As shown in FIG. 5, considering this situation, the con-rod fracture machine according to the present invention allows the engagement members 72, 72 to press both shoulder portions of the cap portion 1B against the mandrel half portion 37 to be thus held. Moreover, the notch 41a of the engagement member 41 is allowed to press the rod portion 1A against the mandrel half portion 38 to prevent the sideward displacement thereof. It is thereby made possible to provide a good property for the fracture surfaces subjected to the second fracture. The notch 41a of the engagement member 41 is allowed to hold the small end portion 1b of the con-rod 1, that is, the rod portion 1A is held at the farthermost position from the mandrel half portion 38. It is thereby made possible to prevent the sideward displacement of the rod portion 1A in a very favorable and easy manner.

After the large end bearing 2 has been fracture separated, the selector valve 92 is actuated to change the position 92C to a position 92B. This causes the high-pressure working fluid to be supplied from the accumulator 91 through the selector valve 92 and the check valve 93 to the port 51b of the cylinder 51. On the other hand, the working fluid in the cylinder 51 flows from the port 51a through the throttle valve 96 and the selector valve 92 to the tank 81. This causes the rod 52 to be compressed to raise the wedge 53, allowing the wedge 53 to return to the initial position. Subsequently, the selector valve 92 is inactivated to change over to the position 92C. Withdrawal of the wedge 53 from the mandrel half portions 37, 38 will cause the support members 31, 32 to move toward each other with the spring force of the shock absorber mechanisms 34, 35 (FIG. 3). Thus, the aforementioned fracture separated rod portion 1A and the cap portion 1B are brought into contact with each other. The fracture of the large end bearing 2 of the con-rod 1 is thus completed and the process proceeds to the next step.

Figure 7:
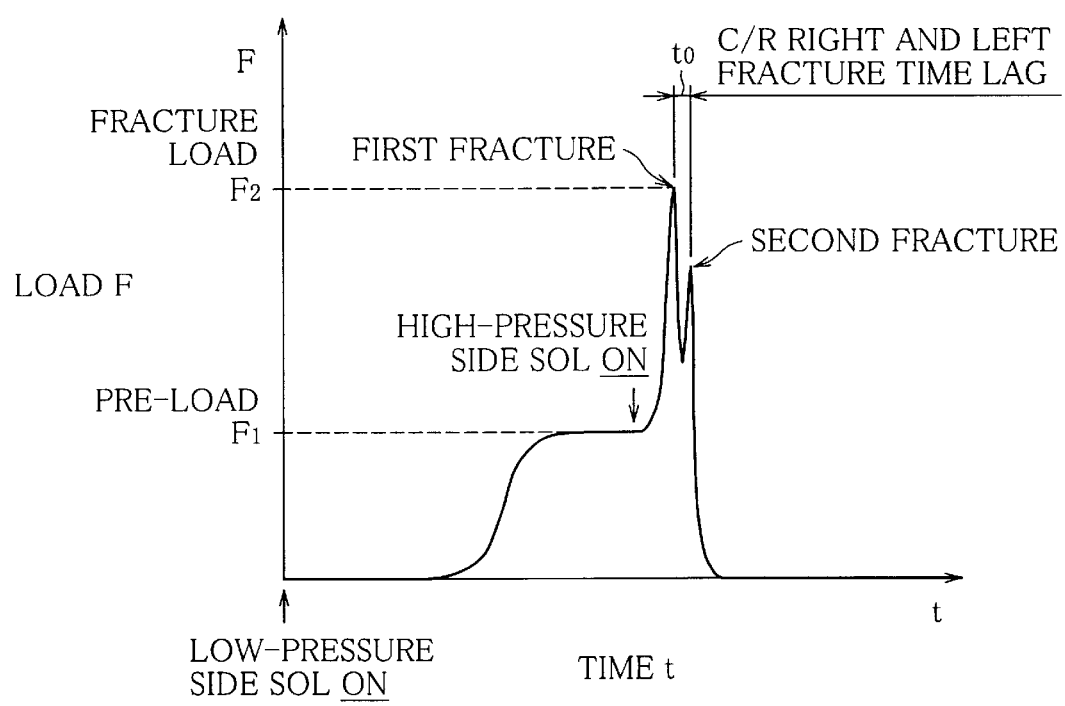
FIG. 7 is a characteristic view illustrating the change in load applied to a wedge for fracturing a con-rod.

FIG. 7 is a characteristic view illustrating the change in load applied to the wedge 53 upon fracture of the con-rod 1. The low-pressure selector valve 85 is switched to the position 85A to apply an initial load (pre-load) F1 to the wedge 53. Subsequently, the high-pressure selector valve 92 is switched to the position 92A to instantaneously apply a fracture load F2 to the wedge 53. This initiates the fracture separation of large end bearing 2 of the con-rod 1, causing preceding fracture in any one of the right and left portions (first fracture) and the subsequent fracture in the other portion (second fracture) after a very short time lag.

Figure 8:
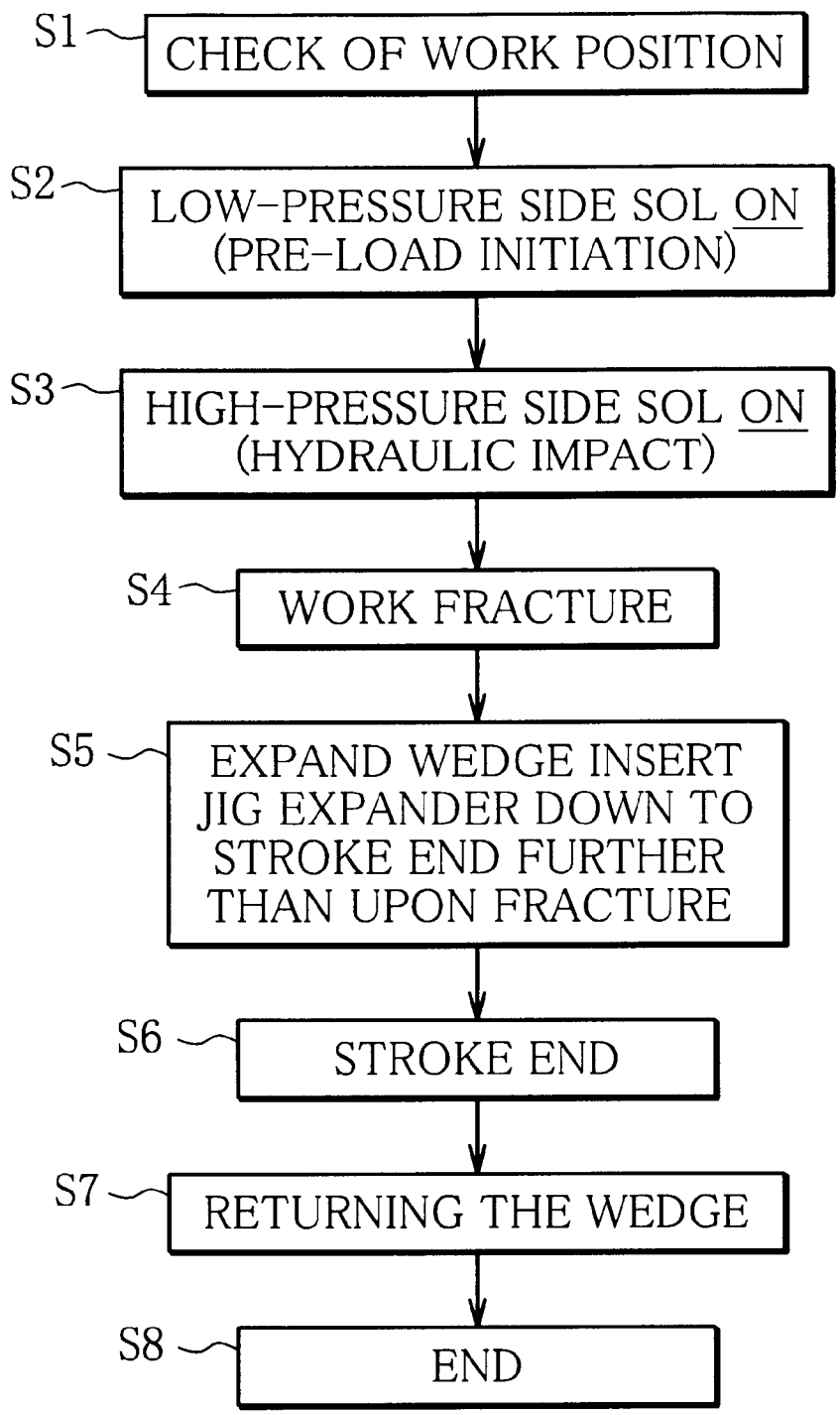
FIG. 8 is an explanatory flow chart illustrating the operation procedure of the fracture machine shown in FIG. 2.

FIG. 8 is an explanatory flow chart illustrating the operation procedure of the fracture machine shown in FIG. 2. First, a control circuit (not shown) checks if a workpiece (con-rod 1) is available on the pallet 24 (step S1). The workpiece is checked in accordance with the change in stroke of the cylinder 65 which drives the pressing plate 68 (FIGS. 2 and 3) for pressing the con-rod 1. Subsequently, the low-pressure selector valve 85 is activated to switch to the position 85A to initiate the provision of the initial load (pre-load) (step S2). Then, the high-pressure selector valve 92 is activated to switch to the position 92A for the application of a fracture load (step S3) to fracture the con-rod 1 (step S4). The cylinder 51 moves down to the end of the stroke for the insertion of the wedge 53 to expand the support members 31, 32 beyond the fracture position (step S5). It is detected that the rod 52 of the cylinder 51 has reached the end of the stroke (step S6). Then, the cylinder 51 is compressed to allow the wedge 53 to return to the initial position (step S7) to complete the process (step S8).

What is claimed is:

1. A connecting rod fracture machine comprising
    a pallet for placing thereon a connecting rod to be fractured,
    first and second support members for supporting a large end portion and a rod portion of said connecting rod, respectively, said first and second support members being arranged on a base of said pallet so as to each be movable in respective opposite directions,
    a half-split type mandrel, vertically provided on said first and second support members, comprising two mandrel half portions each having an outer peripheral surface adapted to contact an inner surface of an opening of said large end portion of said connecting rod, a wedge, with tapered surfaces in contact with opposite edge surfaces of said mandrel half portions, for separating said mandrel half portions uniformly apart from each other, a cylinder for moving said wedge toward said mandrel, an actuator comprising an accumulator for accumulating a high-pressure working fluid, and a valve for instantaneously supplying the high-pressure working fluid from said accumulator to said cylinder so as to apply a load to said wedge, and control means for applying an initial load to said actuator to bring each of said mandrel half portions into contact with said inner surface of said opening of said large end portion of said connecting rod, and for thereafter applying a fracture load to instantaneously fracture said opening by instantaneously supplying the high-pressure working fluid from said accumulator to said cylinder via said valve.

2. The connecting rod fracture machine according to claim 1, wherein said first support member comprises a pressing member for pressing shoulder portions of a cap portion of said connecting rod against said mandrel half portions, respectively, and wherein said second support member comprises an engagement member for holding a small end portion of said connecting rod.

3. The connecting rod fracture machine according to claim 2, wherein the engagement member of said second support member comprises, on a front end portion thereof, a V-shaped notch.

4. The connecting rod fracture machine according to claim 1, wherein each of said mandrel half portions is adapted to contact with said inner surface of the opening of said large end portion of said connecting rod at three points along the outer peripheral surface of each of said mandrel half portions.

5. A method for fracture separating a connecting rod, comprising:

placing the connecting rod on a pallet, holding said connecting rod by supporting a large end portion and a rod portion of said connecting rod on first and second support members, respectively, and bringing an outer peripheral surface of each of two mandrel half portions of a half-split type mandrel mateably into contact with an inner surface of an opening of said large end portion of said connecting rod, said first and second support members being arranged on a base of said pallet so as to each be movable in respective opposite directions, and said half-split type mandrel being vertically provided on said first and second support members, applying an initial load to said inner surface of said opening of said large end portion of said connecting rod using a wedge having tapered surfaces in contact with opposite edge surfaces of said mandrel half portions to bring each of said mandrel half portions into contact with said inner surface of said opening, and fracturing said opening instantaneously by applying a fracture load to said inner surface of said opening by instantaneously supplying a high-pressure working fluid via a valve from an accumulator to a cylinder for moving said wedge toward said mandrel.

6. The method for fracture separating a connecting rod according to claim 5, wherein said connecting rod is held by pressing shoulder portions of a cap portion of said connecting rod against said mandrel half portions, respectively, by means of said first support member, and holding a small end portion of said connecting rod by means of an engagement member of said second support member.

7. The method for fracture separating a connecting rod according to claim 6, wherein the small end portion of said connecting rod is held by means of a V-shaped notch provided on the engagement member of said second support member.

8. The method for fracture separating a connecting rod according to claim 5, wherein the outer peripheral surface of each of said mandrel half portions is brought mateably into contact with said inner surface of said opening of said large end portion of said connecting rod at three points along the outer peripheral surface of each of said mandrel half portions.

* * * * *